March 13, 1962     A. M. MARKS ET AL     3,024,701
FLAKE GLASS PANEL STRUCTURES

Filed Dec. 3, 1956     2 Sheets-Sheet 1

INVENTORS.
ALVIN M. MARKS
MYRON KAHN
MORTIMER M. MARKS
BY Albert Kronman
ATTORNEY March 13, 1962  A. M. MARKS ET AL  3,024,701
FLAKE GLASS PANEL STRUCTURES
Filed Dec. 3, 1956  2 Sheets-Sheet 2
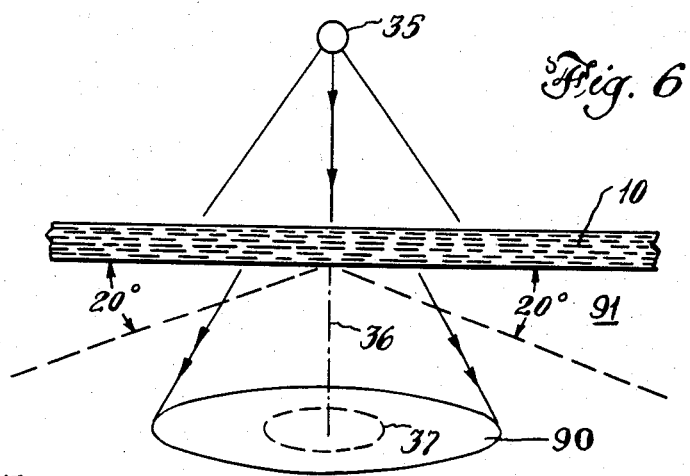
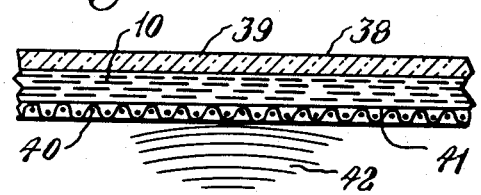
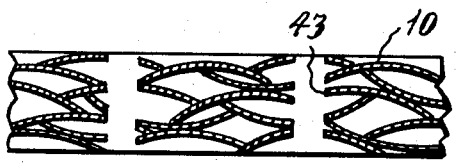
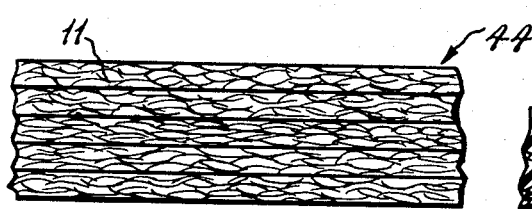
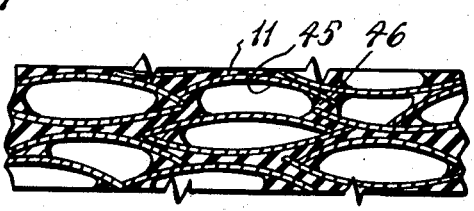
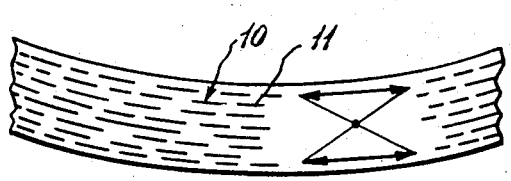
INVENTORS.
ALVIN M. MARKS
MYRON KAHN
MORTIMER M. MARKS
BY Albert F. Kronman
ATTORNEY

United States Patent Office 3,024,701
Patented Mar. 13, 1962

3,024,701
FLAKE GLASS PANEL STRUCTURES
Alvin M. Marks, 149—61 Powells Cove Blvd., Whitestone, N.Y.; Myron Kahn, Whitestone, N.Y.; and Mortimer M. Marks, 166—25 Cryders Lane, Whitestone, N.Y., assignors, by mesne assignments, to said Alvin M. Marks and said Mortimer M. Marks
Filed Dec. 3, 1956, Ser. No. 626,025
9 Claims. (Cl. 88—65)

This invention relates to flake glass panels and specifically to panels having the power to control, absorb, reflect, refract and otherwise effect light, heat and sound incident thereon.

This application is a continuation in part of an application for patent filed November 14, 1952, Serial No. 320,440, by Alvin M. Marks entitled Glare Eliminating Optical System, now U.S. Patent No. 2,887,566, issued May 19, 1959.

It has long been known that light directed at a plurality of parallel light-transmitting plates will be modified in its travel through said plates. Certain proportions of the light will be reflected, others refracted, and a certain amount will emerge from the plates as polarized light. Such plates have been used from time to time as a source of polarized light, but the size and number of plates required to produce the polarized light, as well as the inefficiency of such systems, have resulted in their limited use.

In Patent No. 2,492,809 issued to Alvin M. Marks, on December 27, 1949, it was disclosed that a highly efficient light polarizer could be made from a plurality of thin light-transmitting plates or sheets secured together in spaced relationship. Accordingly, it is an object of the present invention to provide a light polarizing panel made of a plurality of glass flakes secured together to form a panel having flat air spaces between the said flakes.

Another object of the present invention is to provide flake glass panels having unique light transmitting and refracting properties.

A further object of the present invention is to provide a flake glass panel having heat reflecting ability.

An object of the present invention is to provide a rigid self-supporting flake glass panel.

Still another object of the present invention is to provide a flake glass panel which will maintain its properties and structural form despite prolonged usage and exposure to high temperatures or weathering conditions.

Another object of the present invention is to provide an inexpensive flake glass panel which is both decorative and optically useful.

A further object of the present invention is to provide a flake glass panel capable of absorbing sound waves impinging thereon.

An object of the present invention is to provide a flake glass panel within which is incorporated luminous material.

A feature of the present invention is its use of extremely small flat air spaces disposed in parallel orientation but random arrangement within the panel.

Another feature of the present invention is its self-supporting cellular construction.

A further feature of one form of the present invention is its use of high index coatings on the flakes of glass to achieve efficient polarization.

A feature of the present invention is its use as a unitary structure flat electroluminescent lighting element and multi-layer polarizing panel.

A further feature of the present invention is its use of a layer of fiber glass bonded to the flake glass panel for sound absorbency.

Still another feature of the present invention is its use of a plurality of flakes of optimum size to produce a louvre effect in the light-transmitting panel.

The invention consists of the construction, combination and arrangement of parts and methods as hereinafter described, and in which similar parts have been given identical numbers, in the figures, and in which:

FIGURE 6 is a somewhat diagrammatic view illustrating the effect of a flake glass panel made in accordance with the present invention upon light directed through said panel.

FIGURE 7 is a cross sectional view, somewhat enlarged, of a sound absorbing flake glass panel made in accordance with the present invention.

FIGURE 8 is a fragmentary cross sectional view greatly enlarged of another form of sound absorbing flake glass panel according to the present invention.

FIGURE 9 is a cross sectional fragmentary view greatly enlarged of a further form of glass flake panel according to the present invention.

FIGURE 10 is a fragmentary cross sectional view of the panel shown in FIGURE 9 greatly enlarged.

FIGURE 11 is a somewhat diagrammatic view in cross section of a flake glass panel made according to the present invention showing a stress diagram thereof.

Figure 1:
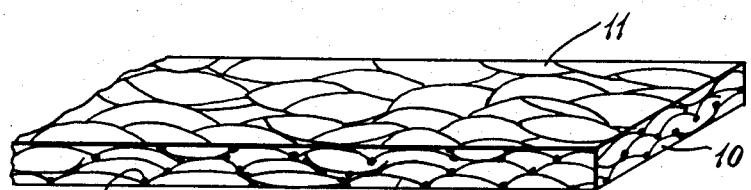
FIGURE 1 is a view in perspective of one complete embodiment of the present invention, somewhat enlarged.

Referring to the drawings and specifically to FIGURE 1, 10 indicates a flake glass panel consisting of a plurality of glass flakes 11 secured together as indicated at 12, and having substantially flat air spaces 13 therebetween. The glass flakes 11 are preferably of a thickness of 5 microns (about $2/10,000$ of an inch). Such flakes are commercially available and are manufactured by the fragmentation of a large flat bubble or cylinder. The flake, as manufactured varies widely in size and curvature which, however, is large in radius so that the flakes are almost flat. The slight curvature keeps the flakes from lying in contact with each other and entraps air spaces therebetween. The individual flakes are irregular in outline. The properties of the flakes make them, when handled in the manner hereinafter more fully described, highly desirable components for the formation of panels.

In the manufacture of a panel, such as is shown in FIGURE 1, it has been found that the large size flakes, for example, $1/16''-1/4'' \times .0002''$, produce a more efficient article, since they present a smaller proportion of edge to light transmitting area. A large ratio of edge to area results in excessive light scatter and depolarization of transmitted light. Accordingly, and as the first step in the manufacture of the panel shown in FIGURE 1, the flakes 11 are sorted to separate the large from the small. The smaller flakes can be removed by suspending the flakes in a water solution, agitating the suspension, and allowing the solution to pass through screens having suitable sized meshes, or by steps of settling or decanting. As a further method of separating the flakes, they may be blown in an air stream to cause them to become graded due to their different transport rate. A gravity fall in air may also be used to separate the flakes into the different sizes.

The flake glass of suitable dimensions is next intermixed with water and stirred slowly with just sufficient agitation to keep the flake in suspension without breaking the flakes into smaller particles. To the solution containing the flakes there is added approximately 1½% by weight of the flakes of an adhesive transparent plastic or jell. The transparent adhesive plastic or jell has a tendency to cling to the individual flakes, as the solvent is driven off.

The glass flakes are caused to come to rest upon a suitable support, such as a screen or wire mesh (not shown) by draining off the suspending liquid. The flow of the liquid through the screen forces the flakes to lie flat on the support. During the settling of the flake upon the support, the said support may be agitated to improve the horizontal alignment of the flake into the structure shown in FIGURE 1. The deposition of the flake upon the support may be compared to the settling of snow upon the ground in which the thin, substantially flat crystals come to rest in almost parallel, horizontal orientation. Because of the slight curvature of the flake 11, air spaces 13 result, therebetween. The curvature of the flake also causes a small quantity of the suspending liquid containing the adhesive material to collect along the edges of each flake. The adhesive material has been indicated as 14 in FIGURE 1 by dots, although it is to be understood that in the actual structure the amount of adhesive material remaining in the finished article is almost microscopic in its cross sectional dimension.

As illustrated in FIGURE 1, the flakes are randomly aligned within the panel so that there is no tendency to the edges of certain flakes to line up. In this manner light rays encounter the same average number of glass flakes and air space interfaces at all places over the area of the panel.

Suitable adhesive materials for use in conjunction with the manufacture of a structure in accordance with the present invention may comprise the following:

(1) Polyvinyl butyral: .05–3% in a suitable solvent such as n-propanol. The polyvinyl butyral may contain 30% plasticizer such as dibutyl phthalate.
(2) Water emulsions:
   (a) Polyvinyl pyrolidine-polyvinyl acetate copolymer.
   (b) Acrylic copolymers.
   (c) Acrilonitrile-butadiene copolymers.
(3) Polyvinyl pyrolidine-polyvinyl methyl ether maleic anhydride (PVM/MA) mixture—pH adjusted to about 5–5.5 mixed with a small amount of detergent such as "Calgon" to keep the flakes apart until settled out. On heating, this mixture becomes insoluble.

These adhesive compositions may be mixed in the following proportions and applied to the flake in the following manner—

C-solution: Parts
900 $H_2O$; 100 polyvinyl pyrolidine; pH acidify 3.0–3.5 with $H_2SO_4$ _____ 20
(900 $H_2O$) alkalize with $NH_4OH$ from (100 PVM/MA) pH 3.0 to 5.5 and heat to form solution _____ 10
Water _____ 10

Flake mixture: Parts
C-solution _____ 1
Calgon _____ 1
Flake _____ 4
$H_2O$ _____ 4,000 flow through screen and heat to 500° F. for three minutes.

When the water is substantially removed from the structure the small amount of adhesive remaining therein will secure the individual flakes together at their contact edges to form a substantially self-supporting rigid structure, with air spaces in between.

Figure 2:
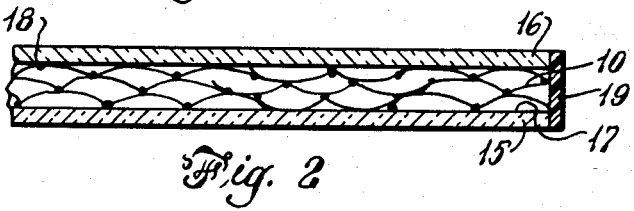
FIGURE 2 is a cross sectional view, somewhat enlarged, of a second embodiment of the present invention.

Referring now to FIGURE 2, there is shown a glass flake polarizing structure 10, such as is described in conjunction with FIGURE 1, which is supported on both sides by glass plates 15, 16. The structure shown in FIGURE 2 may be made by first adhering the flake glass sheet 10, to the base glass sheet 15, by means of adhesive coatings 17. Thereafter the entire structure is heated to eliminate the last traces of solvent and to allow air to penetrate the interstices between the layers of flakes. The upper sheet 16, coated with a suitable adhesive coating 18, is applied with a light amount of pressure to the top of the panel 10, to bind the entire composite together. The assembled structure may then be sealed as indicated at 19, to preserve the panel from exterior contamination. Any suitable material such as self-setting epoxy resin may be employed for this purpose.

Figure 3:
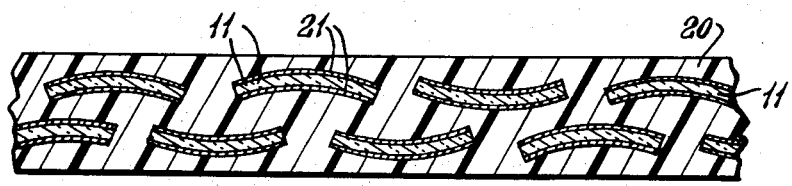
FIGURE 3 is a cross sectional view, somewhat enlarged, of a third embodiment of the present invention.

In the embodiment of the invention shown in FIGURE 3, there is illustrated a panel 20, which is in substance a transparent resinous body, containing therein a plurality of glass flakes 11 which has been specially prepared in accordance with the following disclosure.

The resinous material may comprise an unsaturated polyester containing monomeric methyl methacrylate presently sold under the trade name Paraplex P433, blended with a monomeric styrene or vinyl toluene. Benzoyl peroxide may be used with the resinous material as an accelerator. Certain other known resins having similar properties may be used in place of the material described above, such as, for example:

Polyvinyl acetate
    Cellulose esters
    Acrylonitrile copolymers
    Melamine urea The glass flakes 11 are suspended within the resinous sheet as illustrated in the somewhat greatly enlarged showing of FIGURE 3. The glass flake is disposed in the plastic so that it lies substantially parallel with the outer surfaces of the plastic sheet 20. Each of the glass flakes 11 is coated on one or more sides with a material having a high index of refraction and preferably transparent and colorless. Such material may comprise a film of titanium dioxide and is indicated at 21 in FIGURE 3. It will be seen from an examination of FIGURE 3 that each coated flake presents a plurality of layers in addition to the fact that there may be many layers of coated flakes disposed throughout the thickness of the panel 20 in any given area. As a result of the multi-layered construction a high percentage of polarization may be achieved with this form of panel structure without air spaces. This structure also displays great strength and rigidity.

When titanium dioxide with an index of refraction of about 2.6 is used for coating the flake, each flake has four interfaces for the titanium dioxide coating, to glass flake of index of approximately 1.52, to resin index approximately 1.51. The relative index of refraction at each titanium diode interface therefore is approximately 1.72, which corresponds to Brewster's angle of 60° to the normal of the sheet. This angle is particularly useful for certain devices and applications requiring the production of polarized light.

Figure 4:
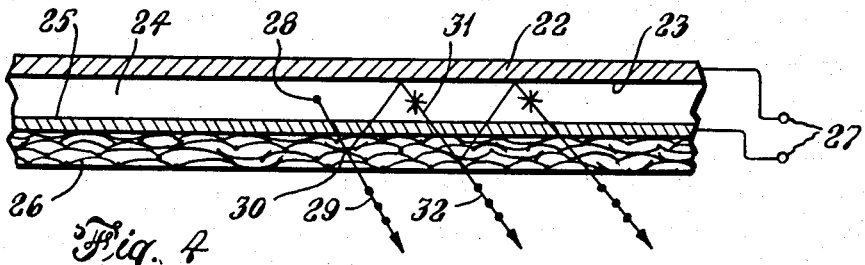
FIGURE 4 is a cross sectional view, somewhat enlarged, of a self-luminous panel made in accordance with the present invention.

In the embodiment illustrated in FIGURE 4, there is shown a self-luminous panel containing glass flakes capable of being its own light source and polarizing said light on its way through the said panel. The self luminous panel may be built upon a metal sheet 22. The bottom surface of the sheet 22 is coated with a white reflecting material 23, which has the property of depolarizing light incident thereon. An electroluminescent phosphor 24, which may be translucent or transparent, is disposed adjacent the depolarizing surface 23. A transparent conductor 25 which may comprise a thin metal layer is evaporated or deposited upon the surface of the phosphor 24. Alternately, thin electrically conducting fine mesh may be employed for this purpose. A panel of light polarizing material such as is herein described is secured to the bottom of the structure as indicated at 26. When a suitable electrical potential is applied to the structure by means of electrodes 27, connected to the metal sheet 22 and the thin conductive layer 25, light will be produced in the electroluminescent phosphor 24. Tracing one ray of light 28 from the phosphor, it will be seen that the ray 28 traverses the conductor 25 and enters the polarizer 26. A portion of the ray 28 emerges from the polarizer 26 as polarized ray 29. The remainder of the ray 28 is internally reflected by the polarizer as indicated at 30, and strikes the depolarizing surface 23 of the sheet 22, or else is scattered and depolarized within the phosphor. The depolarized ray 31 is again directed at the polarizer 26, within which a certain portion of said ray is again transmitted emerging as polarized ray 32 and the remainder of said ray is reflected, depolarized, and redirected at the polarizer 26. This reflux action results in substantially all of the light created by the phosphor emerging from the structure as polarized light, polarized in the same plane, for any given bundle of rays.

Figure 5:
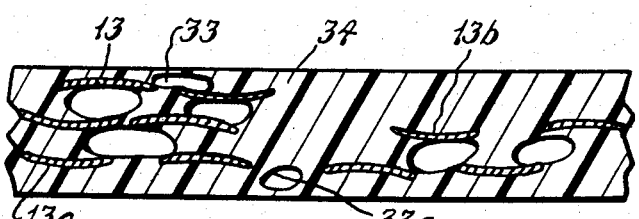
FIGURE 5 is a cross sectional view, somewhat enlarged, of another embodiment of the present invention.

Referring to FIGURE 5 there is shown an embodiment comprising, a resinous mass 34, clumps of more or less parallel glass flakes 13, 13a 13b, and air bubbles 33, formed by the gasification of the resinous mass as hereinafter described, forming flat air spaces between flakes, and occasional round bubbles 33a where there are no flakes. The flakes are introduced into the resinous mass while it is in the partially polymerized form, mixed, and extruded to orient the flakes, which gather more or less into clumps forming a pleasing reflective pattern. Then heat is applied quickly, and the composite sheet is thereupon solidified. The gas bubbles are constrained to form flat air spaces where they happen to form between the flat aligned glass flakes. The percentage of glass to resin can be controlled so that when a high enough percentage of glass flake to resin is obtained the majority of the air bubbles formed will then be flat.

In FIGURE 6 there is shown the effect of panels such as are herein described upon light incident thereon. The panel 10 receives light from the light source 35. The light emitted from panel 10 is in a form of a conical field of polarized radiation, 360° about the vertical axis 36. Each light ray is polarized in such a plane that it tends to be transmitted rather than reflected from on horizontally disposed surfaces. Immediately below the light source 35 there is a small area of light generally indicated at 37 which is not polarized. However, this source being along the vertical axis 36 will not produce a glare component upon the surface illuminated. Between zero and 20° to the surface of the polarizing sheet 10 there is a strong light cut off or louvre-like effect and substantially no light is emitted by the panel between these angles. This louvre-like effect prevents glare from direct viewing of overhead light when viewed through the panel. The panel 10 thus acts to provide a low brightness ceiling due to the louvre-like effect, while at the same time affording the desired nonglare illumination beneath it. Panels made in accordance with the present disclosure therefore, eliminate the need for louvres or other light blocking members in overhead illumination. More light can be directed at subjects and less reflected or direct glare will result. The field of polarized light is free from direct glare from the light source, and from reflected glare on surfaces viewed. The reduction of surface reflected components causes an improvement of contrast ratio between adjacent areas being viewed. On surfaces which are colored, and viewed under light coming from the panel 10, hues will appear more strongly saturated and colors as well as black and white pictures and printing will take on a more vivid and contrasting appearance. These effects occur at a wide range of angular distribution and when many fixtures are used in a room these desirable effects may be seen generally at all directions of viewing. The panel structures herein described comprising glass flakes and air spaces have desirable acoustic absorbing qualities, which are felt to be due to the plurality of flake elements caused to vibrate by a sound wave passing through such a panel. The individual flakes cause a damping and attenuation of the sound energy because of the internal frictional forces set up in the glass flakes. The flakes upon rapidly oscillating transform the sound energy into heat energy and thereby dissipate the sound energy and reduce its amplitude in transmission through the said panel. In FIGURE 7 there is shown a panel which, in addition to the foregoing, contains other sound absorbing properties which are highly desirable. The panel 38 shown in FIGURE 7 consists of a sheet of glass 39, upon which is secured a multi-layer glass flake polarizer 10. A thin foil of glass fiber 40 is cemented to the outer face 41, of the panel 10. Sound waves, generally indicated at 42 in FIGURE 7, striking the fiberglass layer 40, are transmitted across the entire face of the panel and thereafter absorbed by the glass flakes 10, in the previously described manner.

FIGURE 8 illustrates a further form of sound absorbing light polarized panel in which the multi-layer flake panel 10 is provided with a plurality of small holes 43, drilled or formed therein normal to the plane of the panel 10. The small holes 43 will communicate with a large number of flat air spaces in their passage through the panel 10. Sound waves in passing through the drilled holes 43 will become entrapped in the labyrinth of flat air spaces and further attenuated and absorbed.

In FIGURES 9 and 10, there is shown a further embodiment of the present invention in which panels of substantial thickness using 1–20 layers of thickness .002"–.010" each may be built up. The structure shown in FIGURE 9 consists of a plurality of porous glass flake sheets 10 (made in accordance with the disclosure made above in connection with the structure illustrated in FIGURE 1), which are placed one upon the other until a desired thickness is reached. Each layer of the entire layered structure is immersed in a monomeric solution capable of gasifying under heat. One such solution consists of styrene monomer 20–48 parts, polyester monomer P433 (Rohm & Haas) 48 parts, benzoyl peroxide 2–4 parts. As a result of the numerous air spaces within the glass flakes panel, when the structure is immersed a capillary action causes the solution to be soaked into the structure in large quantities and at a very rapid rate. The multi-layered panel 44 is then placed in a flat press and heated under pressure of 50 lbs. per square inch for approximately 10 minutes at 270° F. As a result of the heating, many flat gas bubbles are formed in the panel at the surfaces of the flakes 11. These gas bubbles are flat because they must expand while confined between the glass flakes which are more or less parallel and close together within the panel. As shown in the enlarged detail of FIGURE 10, the gas bubbles 45 are supported by the glass flakes 11 and also some of the resin binder 46 which is entrapped within the structure. By forming a composite structure of a number of glass flake panels 10 a higher polarizing efficiency can be secured and a greater amount of structural strength is available. The panel may thus be made thin and self supporting even though it extends over a large area.

Forming a glass flake panel in which the glass flakes are parallel to the surface in the manner herein described produces an article of exceptional rigidity and strength. As shown in the stress diagram drawing of FIGURE 11, the flat glass flakes by reason of their parallel alignment to the surfaces of the panel 10 take up most effectively the bending stresses or tension which also lies parallel to the surface of the panel. The extremely large proportion of glass to plastic ranging from 9% glass to 10% plastic to 60% glass to 40% plastic in the structure illustrated in FIGURES 9 and 10 also provide a very strong rigid article.

It is also within the purview of the present invention to form a glass flake panel such as is shown at the left in FIGURE 11 without air spaces between the flake to provide a structure of exceptional tensile strength and rigidity for construction and other purposes.

In addition to the optical and other properties set forth herein the panels made according to the illustration of FIGURES 1, 2, 5, 7 and 10, have superior insulation properties. The transmission of heat or cold through panels of this type is greatly reduced because of the spaces. Radiant heat is also strongly reflected.

Further optical effects exhibited by these panels employed in illuminating devices are the high efficiency in the utilization of the light flux when used in a lighting fixture because of the reflux action disclosed in Patent No. 2,402,176, of the order of 70%, and a particularly desirable angular distribution of intensity and polarization. In the central cone 37 where there is little or no polarization of light, transmission of light is impeded due to the reflection of the light by the panel back toward the source favored. In the middle zone 90 transmission and polarization of the light is at a maximum, and thus wider areas are covered with more uniform illumination than are available with known louvered systems. "Vertical hot spots" which result with conventional louvers are eliminated. Reduction of specular glare is achieved in all directions about the panel over wide areas with maximum effectiveness. In the third zone 91 the cutoff and natural louvering effect is achieved as described herein.

Having thus fully described the invention, what is claimed as new and desired to be secured by Letters Patent of the United States is.

1. A panel having the property of polarizing light passing therethrough comprising a foil of transparent resinous material, a plurality of thin light transmitting glass flakes disposed in substantially parallel orientation with respect to each other and the plane of the panel within the foil and a plurality of substantially flat, gas filled bubbles between adjacent flakes, said flakes and gas filled bubbles being of abruptly different index of refraction.

2. A panel having the property of polarizing light passing therethrough comprising a foil of transparent resinous material, a plurality of thin light transmitting glass flakes disposed in substantially parallel orientation with respect to each other and the plane of the panel within the foil and a coating of a material having a high index of refraction on at least one side of said glass flakes, said flakes and high index material being of abruptly different index of refraction.

3. A panel having the property of polarizing light passing therethrough comprising a foil of transparent resinous material, a plurality of thin light transmitting glass flakes disposed in substantially parallel orientation with respect to each other and the plane of the panel within the foil and a coating of a material having a high index of refraction consisting of titanium dioxide on at least one side of said glass flakes, said flakes and high index material being of abruptly different index of refraction.

4. A sound absorbing panel having the property of polarizing light passing therethrough comprising a plurality of thin light transmitting glass flakes disposed in substantially parallel orientation with respect to each other and the plane of the panel and spaced from each other over the greater portion of their areas, a quantity of a transparent adhesive material interconnecting said flakes, a transparent medium having an abruptly different index of refraction from the flakes, within the space between the said flakes and a layer of glass fibres secured to one side of the glass flake structure.

5. A panel having the property of polarizing light passing therethrough comprising a plurality of thin light transmitting glass flakes disposed in substantially parallel orientation with respect to each other and the plane of the panel and spaced from each other over the greater portion of their areas, and having substantially flat spaces therebetween and a quantity of transparent adhesive material interstitially carried by the panel flakes at their contact edges to secure the flakes together, a transparent medium having an abruptly different index of refraction from the flakes, within the space between the said flakes, and a plurality of sound absorbing bores in the face of said panel in communication with the flat air space.

6. A panel structure having the property of polarizing light passing therethrough comprising a plurality of layers consisting of randomly positioned light transmitting glass flakes oriented in substantially parallel planes with respect to each other and the plane of the panel spaced from each other over the greater portion of their surfaces and secured together at their contact edges, there being entrapped gas bubbles between said flakes, said gas bubbles having been formed by the application of heat to a quantity of a resinous mass capable of gasifying in the presence of heat and interstitially carried by the flake, the whole being bound together as a panel, said flakes and gas bubbles being of abruptly different index of refraction.

7. A panel having the property of polarizing light passing therethrough comprising, a plurality of thin light transmitting glass flakes disposed in substantially parallel orientation and spaced from each other over the greater portion of their areas, and having substantially flat, gas filled spaces therebetween and a quantity of transparent adhesive material interstitially carried by the panel flakes to secure the flakes together, said gas filled spaces having an abruptly different index of refraction from the glass flakes.

8. A panel structure according to claim 7 in which the adhesive material consists of a transparent plastic.

9. A panel structure having the property of polarizing light passing therethrough comprising a plurality of layers consisting of randomly positioned glass flakes oriented in substantially parallel planes with respect to each other and the plane of the panel spaced from each other over the greater portion of their surfaces, there being entrapped gas bubbles between said flakes, said gas bubbles having been formed by the application of heat to a quantity of a resinous mass capable of gasifying in the presence of heat and interstitially carried by the flakes, the whole being bound together as a panel, said flakes and gas bubbles being of abruptly different index of refraction.

References Cited in the file of this patent

UNITED STATES PATENTS

| | | |
|---|---|---|
| 726,485 | Whitney | Apr. 28, 1903 |
| 2,017,705 | Sproxton | Oct. 15, 1935 |
| 2,233,259 | Harth | Feb. 25, 1941 |
| 2,402,176 | Marks | June 18, 1946 |
| 2,403,731 | MacNeille | July 9, 1946 |
| 2,457,785 | Slayter et al. | Dec. 28, 1948 |
| 2,624,857 | Mager | Jan. 6, 1953 |
| 2,669,751 | McCurdy et al. | Feb. 23, 1954 |
| 2,682,081 | Fisch | June 29, 1954 |
| 2,702,580 | Bateman et al. | Feb. 22, 1955 |
| 2,733,367 | Gillson | Jan. 31, 1956 |